Feb. 28, 1928.
S. B. HASELTINE
1,660,445
FRICTION SHOCK ABSORBING MECHANISM
Filed June 8, 1925
2 Sheets-Sheet 1
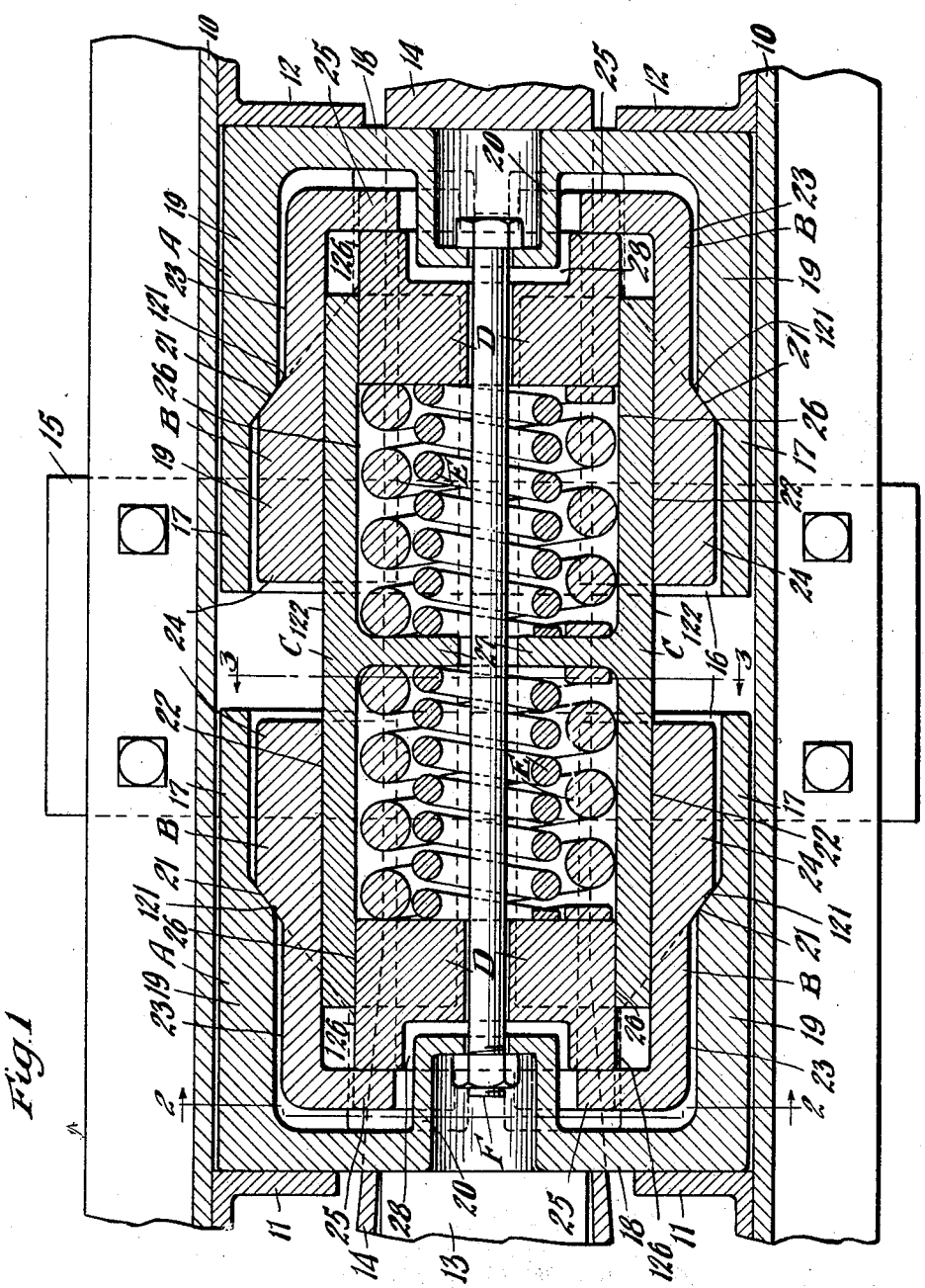
Witness
Wm. Geiger
Inventor
Stacy B Haseltine
By George I. Haight
His Atty.

Feb. 28, 1928.
S. B. HASELTINE
1,660,445
FRICTION SHOCK ABSORBING MECHANISM
Filed June 8, 1925   2 Sheets-Sheet 2
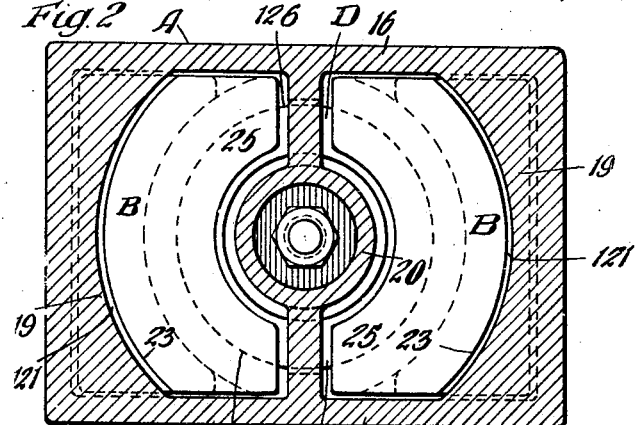
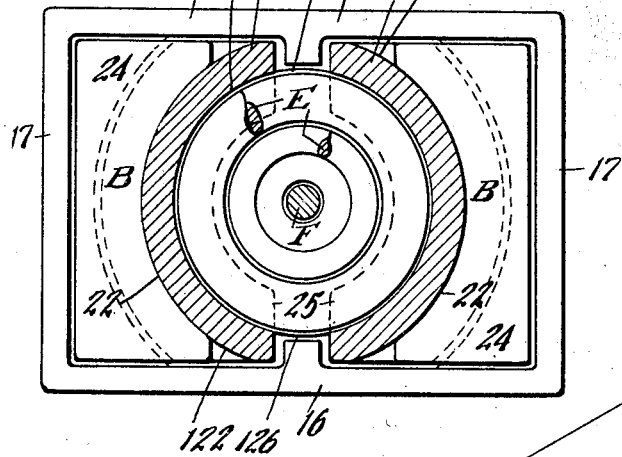
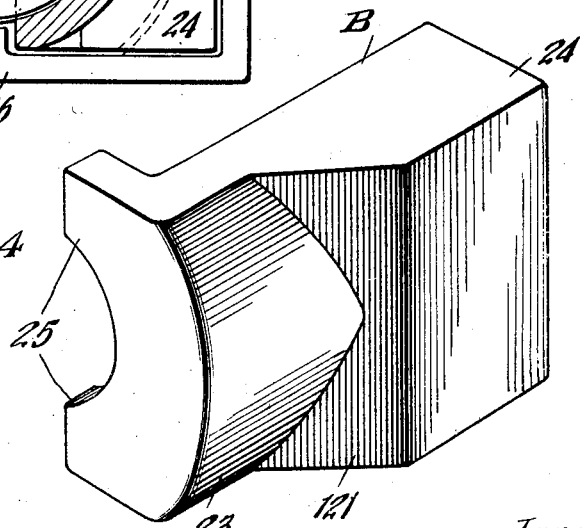
Witness
Wm. Geiger
Inventor
Stacy B. Haseltine
By George I. Haight
His Atty.

Patented Feb. 28, 1928.

1,660,445

UNITED STATES PATENT OFFICE.

STACY B. HASELTINE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed June 8, 1925. Serial No. 35,680.

This invention relates to improvements in friction shock absorbing mechanisms.

One object of the invention is to provide a friction shock absorbing mechanism adapted for use in connection with railway draft riggings, wherein is obtained high capacity during the compression of the mechanism due to large frictional areas, together with asssured quick release when the actuating pressure is reduced.

Another object of the invention is to provide a mechanism of the character indicated of a double ended type, of simple design, including co-operating friction elements and members and means for bringing the elements and members into intimate frictional contact during compression of the mechanism, including a spring resistance arranged for maintaining the friction elements centered.

A more specific object of the invention is to provide a shock absorbing mechanism of the double ended type comprising front and rear follower acting casings having interior wedge faces co-operating with wedge-friction-shoes having frictional engagement with longitudinally disposed friction members which in turn engage front and rear spring followers co-operating with a main spring resistance, wherein the friction wedge-shoes and spring followers have inter-engaging means for transferring the resistance from the spring followers to the shoes.

Other and further objects of the invention will more fully and clearly appear from the description and claims hereinafter following.

In the drawings, forming a part of this specification, Figure 1 is a longitudinal, horizontal sectional view of a portion of a railway draft rigging showing my improvements in connection therewith. Figure 2 is a vertical, transverse sectional view through the shock absorbing mechanism proper, corresponding substantially to the line 2—2, of Figure 1. Figure 3 is a transverse vertical sectional view corresponding substantially to the line 3—3 of Figure 1. And Figure 4 is a detailed perspective view of a friction shoe employed in connection with my improved mechanism.

In said drawing, 10—10 indicates channel-shaped center or draft sills of a railway car underframe, to the inner faces of which are secured front stop lugs 11—11 and rear stop lugs 12—12. The inner end portion of the drawbar is designated by 13, to which is operatively connected a hooded yoke 14 of well known form. The shock absorbing mechanism proper, including the front and rear follower casings is disposed within the yoke 14. The removable parts of the draft rigging are supported in operative position by a detachable saddle plate 15 secured to the respective draft sills.

The improved shock absorbing mechanism proper, as shown, comprises broadly, front and rear follower casings A—A; front and rear pairs of friction wedge-shoes B—B; a pair of friction elements C—C; front and rear spring followers D—D; tandem arranged spring resistance elements E—E; and a retainer bolt F.

The front and rear follower casings A—A are of like construction, each being in the form of a substantially rectangular box-like casting having spaced horizontally disposed top and bottom walls 16—16; vertically disposed spaced side walls 17—17 and a transverse outer end wall 18 adapted to co-operate with the corresponding stop lugs in the manner of the usual follower. The side walls 17—17 of each casting A are thickened adjacent the outer end of the casting and are provided with concave interior walls 19—19. The transverse end wall 18 of each casing is provided with a centrally disposed, inwardly extending, hollow boss 20. The thickened portion of the side walls are provided adjacent their inner ends with flat opposed inwardly diverging wedge faces 21—21.

The friction shoes B are arranged in pairs at opposite ends of the mechanism, each pair co-operating with one of the follower casings A. As most clearly shown in Figures 1 and 4 each friction shoe is in the form of an elongated heavy plate-like member having a curved interior friction surface 22 of true cylindrical contour. At the outer end, each shoe also has a convex side face 23. The rear end portion of the shoe is provided with a lateral enlargement 24 having a flat wedge face 121 at the outer end thereof correspondingly inclined to and adapted to co-operate with one of the wedge faces 21 of the corresponding casing A. As most clearly shown in Figure 4 the enlargement of each shoe is also provided with a flat side face, flat top and bottom faces and a flat inner end face. In this connection it is pointed out that when the mechanism is assembled each pair of shoes B has the cylindrical portions 23 thereof accommodated between the curved walls 19 of the corresponding casing A and the enlargements 24 accommodated within the square portion of the casing; a certain amount of clearance being provided between the side walls of the casings A and the adjacent walls of the shoes. At the outer end each shoe has a laterally projecting flange 25 extending inwardly toward the axis of the mechanism, the flanges 25 of each pair of shoes co-operating with the corresponding spring follower B in a manner hereinafter described.

The friction elements C which are two in number, are arranged at opposite sides of the longitudinal axis of the mechanism and interposed between the front and rear follower casings. Each element C is in the form of a relatively heavy, transversely curved plate having a longitudinaly disposed outer true cylindrical friction surface 122 adapted to co-operate with the friction surfaces 22 of the front and rear friction shoes B at the corresponding side of the mechanism. Each element C is also provided with an interior concave friction surface 26 which is also of true cylindrical form. Midway between the ends, each friction element is provided with an interior laterally projecting web 27, the webs 27 of the two elements C being in tranverse alignment and forming central abutment means for the inner ends of the tanden arranged spring resistance elements E.

The spring followers D are two in number and are disposed at the front and rear end of the mechanism. Each spring follower D is in the form of a relatively heavy cylindrical block having an outer cylindrical friction surface 126 adapted to co-operate with the interior friction surfaces 26 of the friction elements E. At the outer end, each block D is centrally recessed as indicated at 28 to accommodate the boss 20 of the corresponding casing A.

The tandem arranged spring resistance elements E have their opposite ends bearing respectively on the spring followers D and the webs 27 of the friction elements C. Each member of the tandem arranged springs comprises a heavy outer coil and a relatively lighter inner coil.

The mechanism is held in assembled relation and of overall uniform length by the retainer bolt F which has its opposite ends anchored to the hollow bosses 20 of the front and rear casings A respectively. The shank of the bolt extends through alined openings in the front and rear spring followers D, the webs 27 being suitably cut back to accommodate the sides of the shank on the bolt.

The normal position of the parts is that shown in Figure 1. In this position, the spring followers D have their outer ends bearing on the inner walls of the flanges 25 of the corresponding pairs of front and rear friction shoes B, the wedge faces of the shoes being held in intimate contact with the wedge faces of the corresponding casings A. In the normal position of the parts, sufficient clearance is left between the inner ends of the casings A to permit full compression of the mechanism, the casings being adapted to abut when the mechanism is fully compressed to form column elements to transmit the actuating force to the stop lugs of the draft sills, thereby preventing the main springs E from being subjected to excessive pressure and preventing the same from being driven solid.

The operation of my improved shock absorbing mechanism, during a compression stroke is as follows: The front and rear follower casings A will be moved relatively toward each other thereby setting up a wedging action between the same and the corresponding pair of friction wedge shoes, forcing the friction surfaces of all of the shoes into intimate friction contact with the friction surfaces of the friction elements C, the latter being in turn forced against the friction surfaces of the front and rear spring followers D. Inasmuch as the flanges 25 of the friction shoes B are in engagement with the outer ends of the corresponding spring followers, the latter will be forced to approach each other thereby compressing the main spring resistance elements E. During the continued relative approach of the front and rear follower casings A, the friction shoes at one end of the mechanism, together with the corresponding spring follower D, will be forced to slide on the friction surfaces of the friction elements C. Due to the frictional contact between these parts, the elements C will also be forced to slide relatively to the spring follower and friction shoes associated with the other casing A. During this action the friction elements C will be maintained substantially centered between the front and rear follower casings A due to the action of the tandem arranged springs on the webs 27 of the friction elements. The described action will continue either until the actuating force is reduced or the inner ends of the two follower casings come into abutment, whereupon the actuating force will be transmitted directly through the casing to the stop lugs of the draft sills as hereinbefore pointed out.

When the actuating force is reduced the front and rear follower casings will be free to drop away from the friction wedge shoes B and the expansive action of the main spring resistance elements E will project the spring followers D outwardly carrying the corresponding friction shoes B therewith. Outward movement of the casings A will be limited by the retainer bolt F and outward movement of the shoes in turn will be limited by the wedge faces 121 thereof abutting the faces 21 of the corresponding casings.

While I have herein shown and described the preferred manner of carrying out my invention, the same is merely illustrative and I contemplate all changes and modifications that come within the scope of the claims appended hereto.

I claim:

1. In a friction shock absorbing mechanism, the combination with front and rear follower casings having interior wedge faces; a pair of longitudinally disposed friction members, each having abutment means thereon; front and rear spring followers having longitudinally disposed friction surfaces co-operating with said members; front and rear springs engaging said abutment means and co-operating with said spring followers; and front and rear sets of friction shoes interposed between said casings and friction members, said shoes having abutment means at the outer ends thereof co-operating with said spring followers.

2. In a friction shock absorbing mechanism, the combination with front and rear followers each having inwardly acting relatively fixed wedge means associated therewith; of a pair of longitudinally disposed friction members interposed between said followers, said members being disposed at opposite sides of the mechanism; front and rear springs for maintaining said members in centered position between said followers; front and rear spring followers co-operating with said tandem springs, said spring followers having frictional engagement with said members; front and rear sets of friction shoes co-operating with said members and the wedge means associated with said front and rear followers.

3. In a friction shock absorbing mechanism, the combination with front and rear followers having inwardly acting wedge means movable therewith; of friction members interposed between said followers, said members being disposed at opposite sides of the mechanism and having inner and outer friction surfaces extending longitudinally of the mechanism; spring followers at opposite ends of the mechanism interposed between said members and having friction surfaces engaging the inner surfaces of the latter; front and rear sets of friction shoes having wedge faces co-operating with said wedge means, said shoes having interior friction surfaces co-operating with the outer friction surfaces of said members; abutment means at the outer ends of said shoes bearing on the outer ends of said spring followers; and spring resistance means between said spring followers and engaging said friction members to hold the same centered between the followers.

4. In a friction shock absorbing mechanism, the combination with front and rear followers relatively movable toward and from each other, each of said followers having inwardly acting wedge means movable therewith; of a pair of friction members, each provided with longitudinally extending friction surfaces on the opposite sides thereof; a spring resistance co-acting with said members to hold the same centered between the followers; spring followers at the opposite ends of said members and co-operating with one set of friction surfaces thereof; friction shoes on the outer sides of said members, said shoes co-operating with said wedge means; means on said shoes adapted to engage said spring followers for transferring the resistance of said spring from the spring followers to the shoes.

5. In a friction shock absorbing mechanism, the combination with front and rear followers having interior wedge faces; front and rear sets of friction shoes having wedge faces co-operating with said casing wedge faces, said shoes also having interior cylindrical friction surfaces; a pair of longitudinally disposed friction members having cylindrical friction surfaces co-operating with friction surfaces of the shoes; front and rear spring followers engaging said shoes, said spring followers having cylindrical friction surfaces co-operating with corresponding friction surfaces on said members; and a main spring resistance interposed between said spring followers.

6. In a friction shock absorbing mechanism, the combination with front and rear follower casings each having inwardly acting relatively fixed wedge means associated therewith; of a pair of longitudinally disposed transversely curved friction members, said members being disposed at opposite sides of the longitudinal axis of the mechanism; front and rear sets of friction wedge shoes interposed between said members and the respective follower casings; spring followers engaging said shoes and having frictional engagement with said members; and means for yieldingly resisting relative movement of said spring followers.

7. In a shock absorbing mechanism, the combination with front and rear stop members; of a pair of relatively movable casings co-operating relatively with said front and rear stop members; a yoke enclosing said casings; a pair of longitudinally disposed friction elements interposed between said casings; friction wedge shoes interposed between each casing and said friction elements; a pair of spring followers engaging said shoes and having friction engagement with said friction elements, said elements, and spring followers having co-operating curved friction surfaces and said elements and shoes also having co-operating curved friction surfaces; and a main spring resistance interposed between the spring followers.

In witness that I claim the foregoing I have hereunto subscribed my name this 1st day of June 1925.

STACY B. HASELTINE.